United States Patent [19]
Kochis et al.

[11] Patent Number: 5,239,389
[45] Date of Patent: Aug. 24, 1993

[54] PREVIEW PRINT FOR FACSIMILE TRANSMISSION

[75] Inventors: Richard L. Kochis; Brian L. Hastings, both of Fort Collins, Colo.

[73] Assignee: Hewlett-Packard Company, Palo Alto, Calif.

[21] Appl. No.: 722,761

[22] Filed: Jun. 27, 1991

[51] Int. Cl.⁵ .......................................... H04N 1/393
[52] U.S. Cl. .................................... 358/451; 358/405
[58] Field of Search ............... 358/405, 451, 76-77, 358/402-403, 445

[56] References Cited

U.S. PATENT DOCUMENTS

| 4,468,755 | 8/1984 | Iida | 358/403 |
| 4,587,633 | 5/1986 | Wang et al. | 358/403 |
| 4,636,869 | 1/1987 | Tomohisa | 358/451 |
| 4,682,243 | 7/1987 | Hatayama | 358/451 |
| 4,837,635 | 6/1989 | Santos | 358/451 |
| 5,053,885 | 10/1991 | Telle | 358/451 |
| 5,053,886 | 10/1991 | Nakajima | 358/451 |

Primary Examiner—Stephen Brinich

[57] ABSTRACT

Disclosed is a system that accepts data, either from a facsimile scanner or from a computer file, and allows the data to be printed before being sent to a remote facsimile device. The system reads the data, converts the data to a bit mapped raster image if necessary, and prints the data locally before it is sent to the remote facsimile receiving device. The local print resolution for printing the data is selectable, and the system will convert the data into a form suitable for printing that resolution on the local printer. If the local printer can print at a higher resolution, the data is scaled to allow the printing to appear at the desired facsimile resolution to allow the user to evaluate the quality of the data prior to the data being sent.

8 Claims, 3 Drawing Sheets

5,239,389

PREVIEW PRINT FOR FACSIMILE TRANSMISSION

FIELD OF THE INVENTION

This invention relates to computer systems and more particularly to printing facsimile data on such systems. Even more particularly, the invention relates to printing data on a local printer prior to facsimile data transmission.

BACKGROUND OF THE INVENTION

When sending data over facsimile systems, the data is sent in a bit image format and can be sent at various resolutions. For example, facsimile machines can send data at a standard resolution of 100 dots per inch, and at a fine resolution of 200 dots per inch. Increasingly, facsimile machines can also send data at 300 dots per inch. Each increase in resolution requires that more data be sent. Increased data takes additional time and therefore incurs additional telephone charges.

When sending data using small point sizes which result in small characters being printed, or when sending graphics data such as pictures, the data may not be readable when printed at the standard facsimile resolution of 100 dots per inch. When very small point sizes of type, or detailed graphics, are sent, even the fine resolution may not be desirable. Often, however, a user of such a system cannot determine how the facsimile data will appear when printed at the remote location.

This problem is particularly acute when the data being sent is stored in a computer and is not printed before being sent. Modern facsimile transmitting systems can take data stored in computer readable format, such as ASCII, convert the data to a raster image bit mapped format, and send the raster data directly through a facsimile transmitting machine to a facsimile receiving machine. The data is then printed by the receiving facsimile machine.

When sending computer data files using this method, the user sending the data does not see the data in a visible format before it is sent, therefore, if the data does not reproduce adequately at lower resolutions, the sending user will be unaware of the poor quality print until they receive a call from the receiving user. The data will then have to be sent again, using a higher resolution. If this higher resolution is still not adequate, the data will have to be sent again at yet a higher resolution.

Existing FAX machines have a page copy feature that allows data input from the fax scanner to be printed on the fax printer. This provides some previewing capability for printed data, however, these machines do not provide preview capability for computer data files.

There is a need in the art then for a system to print facsimile data locally before such data is sent to a remote facsimile receiving station so that a user can determine the correct resolution to be used when sending the data. There is further need for such a system that prints such data at a user selectable resolution. There is a still further need for such a system that prints data from computer data files as well as data input from a scanning device attached to the facsimile device. The present invention meets these needs.

SUMMARY OF THE INVENTION

It is an aspect of the present invention to allow local printing of data to be sent using facsimile transmission.

It is another aspect of the invention to provide such local printing at a print resolution equivalent to the resolution such data will be printed at the remote facsimile receiving station.

Another aspect of the invention is to provide local printing using graphics mode to provide a faithful reproduction of the facsimile data.

The above and other aspects of the invention are accomplished in a system that accepts a file name for data to be sent to a remote facsimile receiving device, reads the data from the file, converts the data to a bit mapped raster image, and allows the user to print the data on a local printer before the data is sent to the remote facsimile receiving device. The user can select the resolution for printing the data, and the system will convert the data into a form suitable for printing that resolution on the local printer. If the local printer can print at a higher resolution, the data is scaled to allow the printing to appear at the desired facsimile resolution to allow the user to evaluate the quality of the data prior to the data being sent.

The system will also scan data, using the local facsimile scanning unit, and print the data on the local printer at the facsimile transmission data resolution.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
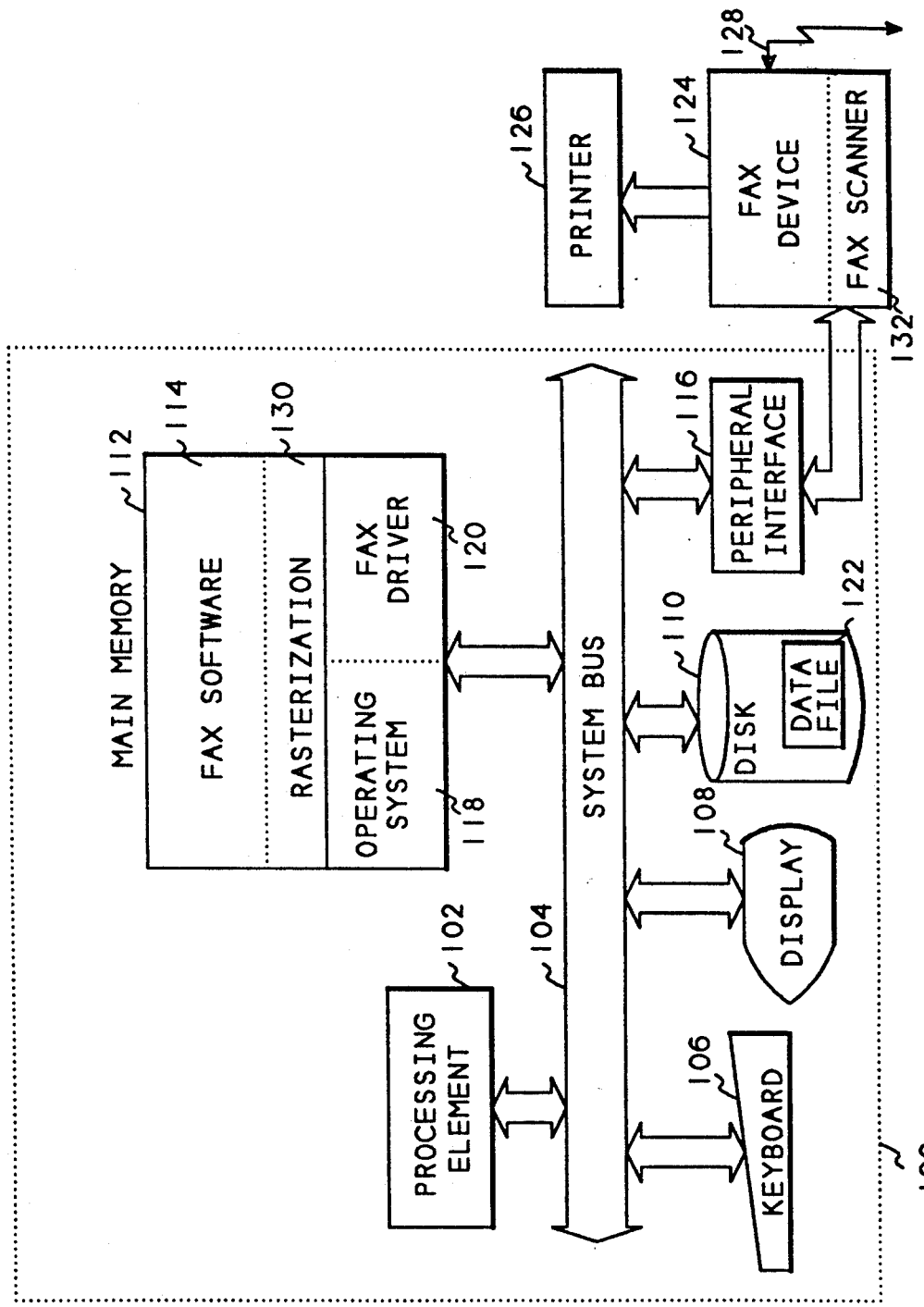
FIG. 1 shows a block diagram of the system of the present invention.

FIG. 1 shows a block diagram of the system of the present invention. Referring now to FIG. 1, a computer system 100 contains a processing element 102 which communicates to other elements of the computer system 100 over a system bus 104. Attached to the system bus 104 is a keyboard 106 which allows a user of the computer system 100 to input textual information into the computer system 100. A display 108 allows the computer system to output information to a user of the computer system. A disk 110 contains the computer software that is part of the present invention, and it also contains data files 122 which can be used by the present invention. A peripheral interface 116 allows the computer system 100 to communicate to a facsimile transmitting and receiving device 124. Attached to the FAX device 124 is printer 126 which is used by the system of the present invention as the local printer. The system of the present invention could, however, use a local printer (not shown) attached directly to the system bus 104. A communications line 128 is used by the FAX device 124 and the system of the present invention to transmit and receive facsimile data to a remote facsimile machine.

Main memory 112 contains the FAX software 114 of the present invention. Within the FAX software 114 is a rasterization process 130 used by the FAX software 114. The FAX software 114 uses the facilities of an operating system 118 and a FAX driver software module 120 to communicate to the hardware of the computer system 100.

Figure 2:
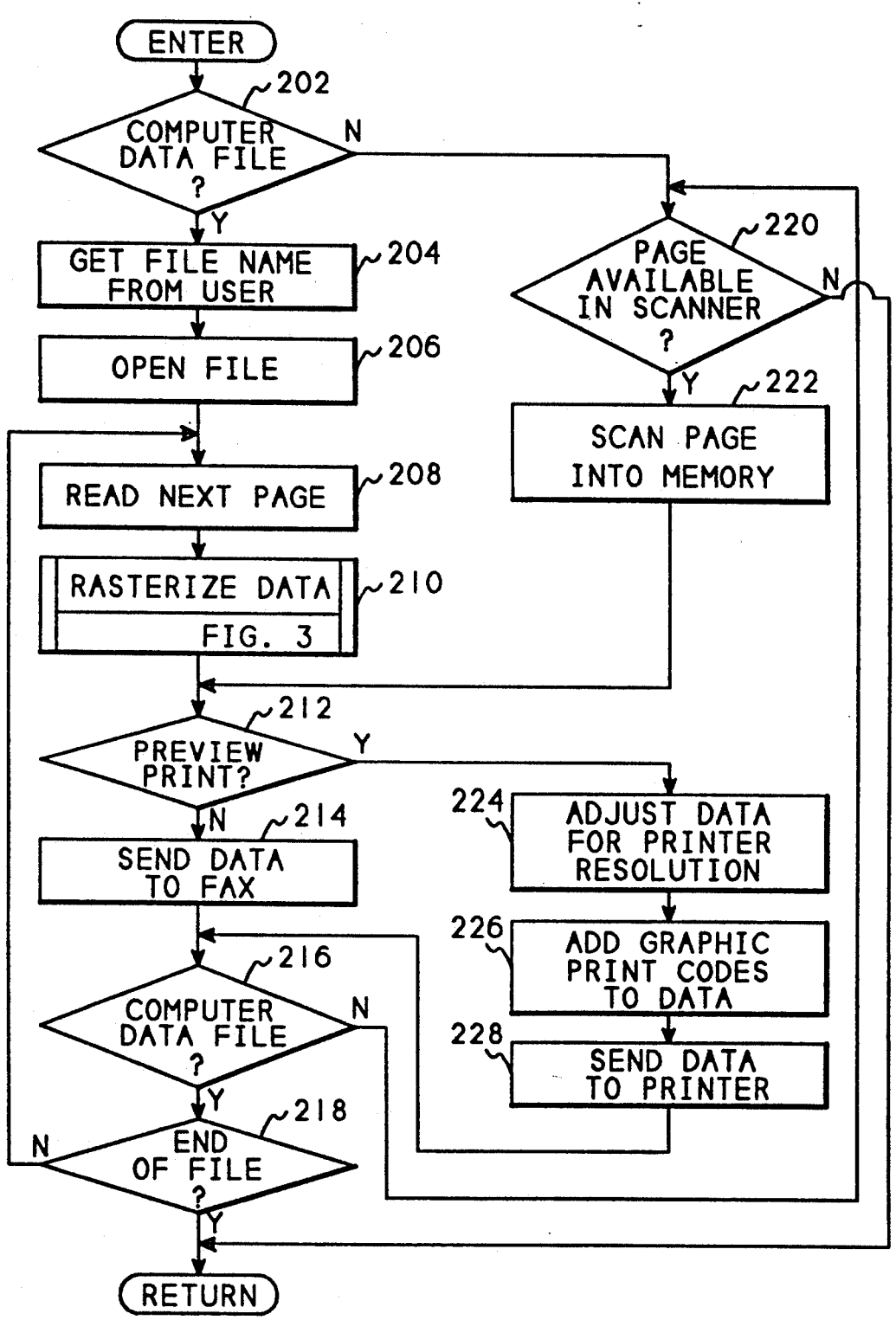
FIG. 2 shows a flowchart of the top level software of the present invention.

FIG. 2 shows a flow chart of the top level software of the present invention. The FAX software of the present invention allows a user of the computer system 100 and the FAX device 124 to print a local copy of data to be sent over the communications line 128 prior to sending such data. This allows the user of the system to obtain a visual copy of the data as it will appear when printed on a remote facsimile receiving station (not shown). Modern facsimile transmitting and receiving stations provide the capability of printing data at multiple resolutions. Commonly, this data may be printed at a resolution of 100 dots per inch, 200 dots per inch, and increasingly FAX machines are capable of printing at 300 dots per inch. As the print resolution increases, the amount of data that must be sent over the communications line also increases. Of course, with increased amounts of data being transmitted, transmission time and cost also increases. Therefore, it is desirable that a user of such a FAX facility be able to view data being sent to determine the lowest resolution at which the data can be correctly printed at the remote FAX station. By determining this lowest resolution, the user of the system may send the data at the lowest resolution, therefore, saving time and cost.

FIG. 2 is called by the FAX software 114 (FIG. 1) whenever the user requests sending a FAX transmission. Referring now to FIG. 2, after entry, block 202 determines whether the data to be sent is contained in a computer file or whether the data will be input to the system through the FAX scanner 132 (FIG. 1). If the data being sent is a computer data file, block 202 transfers to block 204 which obtains the name of the computer file from the user of the system by utilizing the display 108 (FIG. 1) and the keyboard 106 (FIG. 1). After obtaining the name of the data file, block 206 opens the data file and block 208 reads the first or next page of data from the data file. Block 210 then calls FIG. 3 to convert the data from the computer readable form, typically ASCII, which was read from the disk 110 (FIG. 1), into a bit map image capable of being received and printed by a remote facsimile receiving station. After converting the data into a rasterized bit map image, block 210 transfers to block 212 which determines whether the user wishes to perform a preview print of the data. If the user wishes to perform a preview print, the user also enters the resolution at which the print is to be performed. If a preview print is desired, block 212 transfers to block 224 which adjusts the rasterized data to match the print resolution requested by the user. For example, if the user has requested a print resolution of 100 dots per inch, and the printer 126 (FIG. 1) is capable of printing 300 dots per inch, the rasterized data must be scaled by printing each dot three times within a line, and by printing each line three times. After adjusting the data to obtain the desired resolution on the printer, block 224 transfers to block 226 which adds graphic print codes to the data to instruct the printer to print the data in a graphical image format. By printing the data using graphical image format, the user receives a more faithful representation of the quality of the printed page at the remote facsimile station. Block 228 then sends the data to the printer and transfers to block 216 which determines whether a computer data file is being printed. Printing on the local printer can be done through the fax device 124 (FIG. 1), or done through a local printer attached to the system bus 104 (FIG. 1). Printing through the local printer attached to the fax machine creates the most faithful reproduction. If a computer data file is being printed, block 216 transfers to block 218 which determines whether the end of file has been reached and if not, block 218 transfers back to block 208 to obtain the next page of data from the data file. After all pages have been printed, block 218 returns to the FAX software 114.

If the user did not request a preview print, block 212 transfers to block 214 which sends the data to the FAX device 124 (FIG. 1) which in turn sends the data to a remote FAX receiving station over the communications line 128.

If the data being sent is not a computer data file, block 202 transfers to block 220 which determines whether a page is available in the FAX scanner 132 (FIG. 1). If a page is not immediately available in the scanner, the scanner will notify the user to insert a page, however, if the user does not insert a page at this time, block 220 will return to the FAX software 114. If a page is available in the scanner, block 220 transfers to block 222 which instructs the FAX scanner 132 to scan the page and transfer the data into memory 112 (FIG. 1). Block 222 then transfers to block 212 which processes the data in the same manner as the rasterized data described above. After the data has been sent to the local printer or the FAX, as requested by the user in block 212, control transfers to block 216. Since the data being processed did not come from a computer data file, block 216 transfers back to block 220 to read the next page of data from the FAX scanner 132.

Figure 3:
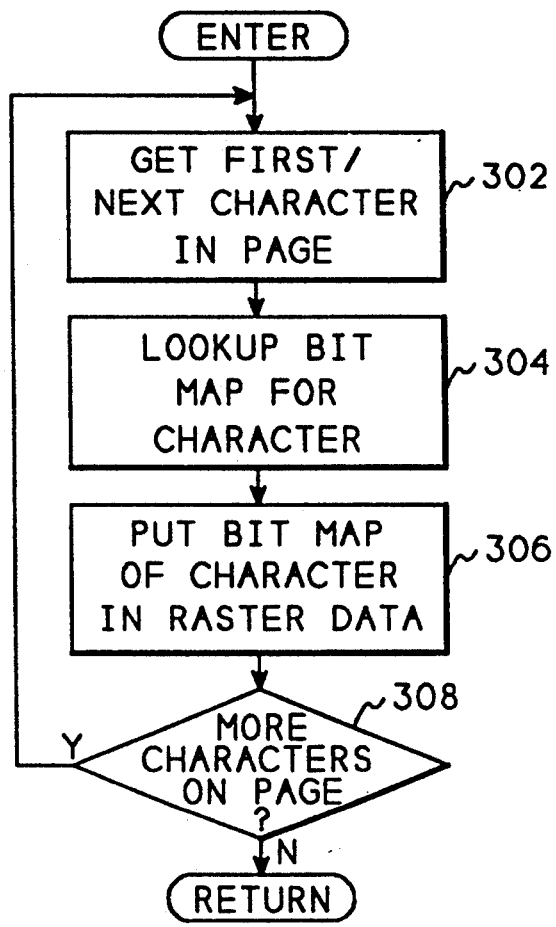
FIG. 3 shows a flowchart of the rasterizing subroutine of the invention.

FIG. 3 shows a flowchart of the rasterizing subroutine called from block 210 of FIG. 2. Referring now to FIG. 3, after entry, block 302 gets the first or next character in the page. Block 304 then uses this character to index into a table which contains a bit image of each character within the character set. Block 304 retrieves the bit image and block 306 stores this bit map image of the character in the raster data which will be sent to the printer or to the FAX machine. Block 308 then determines whether there are more characters on the page and if there are, transfers back to block 302 to process the next character. After all characters have been processed, block 308 returns to FIG. 2 block 212.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for printing, on a local printer, input data to be sent through a facsimile device, said system comprising:
    means for converting said input data into bit image format data;
    means for scaling said bit image format data to allow said bit image format data to be printed at a selectable print resolution on said local printer, wherein said selectable print resolution is less than a maximum resolution of said local printer; and
    means for printing said bit image format data on said local printer.

2. The system as defined in claim 1 wherein said input data is read from a computer data file.

3. The system of claim 1 wherein said data is scanned into said system using a facsimile scanning device.

4. The system of claim 1 wherein said means for printing further comprises means for printing on a printer attached to said facsimile device.

5. A method for printing, on a local printer, a computer file to be sent through a facsimile device, said method comprising:
    reading said computer file into a computer memory;
    converting said computer file into bit image format data;
    scaling said bit image format data to a selectable print resolution, wherein said selectable print resolution is less than the maximum resolution of said printer; and
    printing said scaled bit image format data on said local printer.

6. The method of claim 5 wherein said printing step further comprises the step of printing to a printer attached to said facsimile device.

7. A method for printing, on a local printer, a scanned facsimile data to be sent through a facsimile device, said method comprising:
    reading said scanned facsimile data into bit image format data within a computer memory;
    scaling said bit image format to a selectable print resolution, wherein said selectable print resolution is less than the maximum resolution of said printer; and
    printing said scaled bit image format data on said local printer.

8. The method of claim 7 wherein said printing step further comprises the step of printing to a printer attached to said facsimile device.

* * * * *